Sept. 22, 1970        S. DAVIS ET AL        3,530,361
SOLID STATE D.C. TO SYNCHRO CONVERTER
Filed Sept. 3, 1968                    2 Sheets-Sheet 1

INVENTORS
Sidney Davis
Joseph Carlstein

BY

Edward H. Loveman
ATTORNEY

United States Patent Office 3,530,361
Patented Sept. 22, 1970

3,530,361
SOLID STATE D.C. TO SYNCHRO CONVERTER
Sidney Davis, East Norwich, and Joseph Carlstein, East Meadow, N.Y., assignors to Vernitron Corporation, New York, N.Y., a corporation of Delaware
Filed Sept. 3, 1968, Ser. No. 756,773
Int. Cl. G08c; H02m 7/42
U.S. Cl. 321—5        3 Claims

ABSTRACT OF THE DISCLOSURE

An angular position D.C. signal is chopped, shaped and applied as one input to a Scott-T. A reference source of D.C. voltage is chopped, shaped and applied as a second input to the Scott-T. The Scott-T outputs are indicative of angular position and correspond to synchro output signals.

---

The invention relates to computing devices, and more specifically, to an improved system and apparatus for the conversion of D.C. signals to synchro information.

Conventional automatic control systems which control the angular position of a vehicle, gun, radar antenna, etc., generally sense the position of the vehicle, etc., and relay this information to a remote instrument or a remote control center or the like by means of a synchro system. The synchro system is an electromechanical system in which the angle of a rotatable shaft is converted into three analog voltages whose ratios represent the shaft angle (which may be converted back into a shaft angle). Thus, for example, the bearing of a ship may be measured by detecting the angular position of the master compass shaft with a sensing potentiometer energized from a reference power supply. The sensing potentiometer output which is a D.C. voltage, is converted to synchro data by a conventional servomechanism of the type comprised of an amplifier coupled to a servomotor which mechanically drives a feedback potentiometer and a synchro. When the servomotor is at rest (i.e. the feedback potentiometer voltage is equal to the input voltage of the servomechanism from the sensing potentiometer), the synchro output voltage is a measure of the angular position of the master compass shaft. This type of conversion is extremely slow because the servomotor has to rotate mechanically to the measured angle before the conversion is completed. Moreover, in some applications, the angular positioning is restricted to only a small angular segment, i.e. 90° or less, and therefore a wide angle, i.e. 360° D.C. to synchro converter is not necessary and is superfluous for the range outside of 90°.

In accordance with the invention a compact solid state converter is adapted to produce three wire synchro data in response to a D.C. input signal for angles of interest, i.e. less than 90°. In essence, the converter is comprised of two channels, each channel having a modulator and a shaping network with the outputs from each shaping network coupled to a conventional Scott-T which thereby produces the requisite three wire synchro data. The input to one of the channels is a reference D.C. signal or a modified reference D.C. signal; the input to the other channel is the linear D.C. output from the sensing potentiometer. The modulators may take the form of solid state switches, multi-vibrators or the like, and the shaping networks may be conventional well known filter circuits having sufficiently precise transfer functions (gain and phase versus frequency). The utilization of these components results in a converter superior to prior art converters in regard to cost, simplicity of components, and speed of conversion.

Accordingly, it is a primary object of the present invention to provide a solid state D.C. to synchro converter.

Another object of the present invention is to provide a D.C. to synchro converter which is capable of operating with a frequency response to input angle variations not heretofore available.

A still further object of the present invention is to provide a converter having modulators shaping networks and a Scott-T to generate synchro A.C. voltages in response to an input D.C. signal.

These and other objects and many of the attendant advantages of this invention will be readily appreciated as the same becomes better understood by reference to the following detailed description when considered in connection with the accompanying drawings. The features of novelty which characterize this invention will be pointed out with particularity in the claims annexed to and forming a part of this specification.

Figure 1:
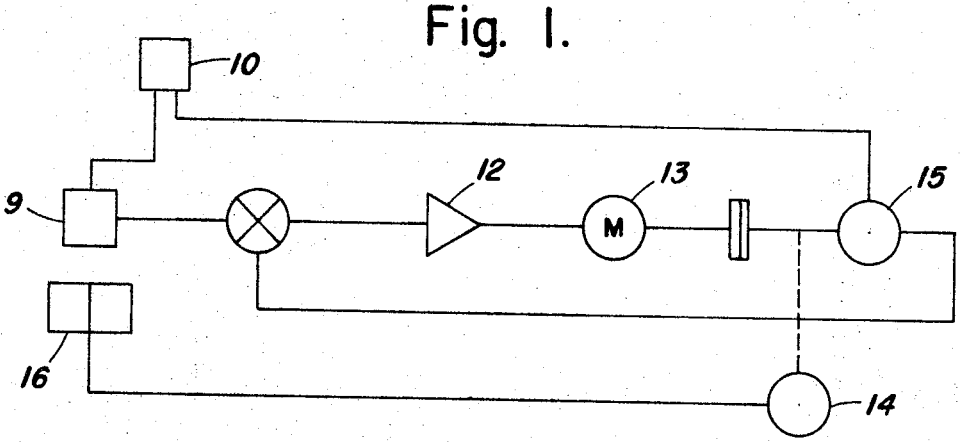
FIG. 1 represents a block diagram of a prior art servomechanism wherein D.C. signals are converted to synchro signals.

Referring now to the drawings wherein like reference characters designate like or corresponding parts throughout, there is shown in FIG. 1 an automatic control system representative of the prior art and designated generally by reference numeral 8. The control system 8 is comprised of a sensing potentiometer 9, which is energized from a reference D.C. source 10 and mechanically coupled to a mechanism which is to be controlled or its motion measured. The D.C. output voltage from the potentiometer 9 representing the angular position of a mechanism is applied to the input of a conventional servoamplifier 12, which drives a servomotor 13, which is mechanically coupled to a synchro 14. A feedback potentiometer 15 may also be driven by the servomotor 13, and may be energized by source 10 to apply a negative polarity output signal (as compared to the polarity of the signal from potentiometer 9) to the input of servoamplifier 12 as is conventional. The output signal from synchro 14 is the desired angle data to be used for driving the mechanism 16 which is to be controlled to a desired position or this synchro signal may be applied to an indicator (not shown). This type of conversion of data (a D.C. signal to synchro signal) is extremely slow because of the response of the servomotor, i.e. it has to mechanically rotate to a position as determined by the magnitude of the input signal, and, moreover, the cost of the components, servomotor, synchro, and amplifier, are rather high.

Figure 2:
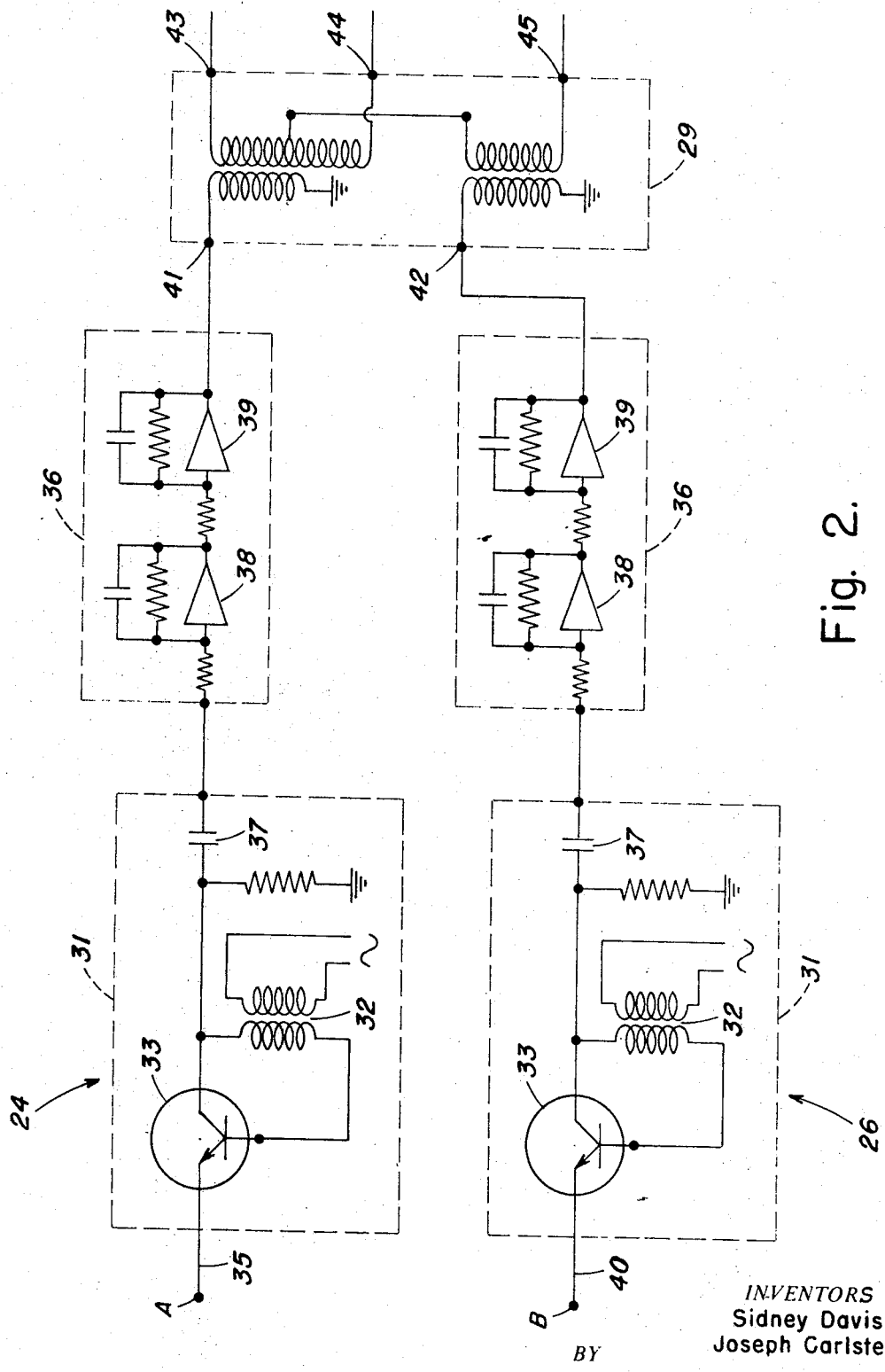
FIG. 2 represents a diagram of a D.C. to synchro converter in accordance with the present invention.

Referring now to FIG. 2, there is shown in block diagram a preferred embodiment of the present invention of a D.C. to synchro converter comprised of a reference channel 26, which is energized from the reference D.C. source 10 at point B, and an input signal channel 24, which is energized from the potentiometer 9 at point A. The output from both channels is connected to a conventional Scott-T 29, which converts the two signals to three output signals that are compatible with the output from a synchro transmitter.

As is well known in the art, the angle data contained in synchro signals, such as the three voltages coming from a synchro transmitter, reside in the ratio of the voltages rather than in the values of the individual voltages. It can be shown that this is equivalent to maintaining an accurate value of the tangent of an angle represented by two voltages, one being the sine and the other being the cosine. Over a small angular extent, i.e. 340° to 20° the cosine signal may be considered to be constant (unity on a normalized basis) and the sine considered linear with a changing angle. This assumption will result in a linear function approximating the angle's tangent, which yields only a very small error in angular position over the limited range, i.e. from 340° to 20°, the error will only be 50 minutes, and is permissible in many applications. Therefore, if we consider the D.C. reference voltage from the reference source 10 applied to channel 26 as equal to the cosine signal, and the input signal voltage applied to channel 24 from potentiometer 9 as a sine signal, then each signal may be modulated at a particular rate (400 Hz.) to form a square wave whose amplitude is proportional to the respective input D.C. levels. By shaping each signal to form a sine wave and combining them in the Scott-T 29, the output, which is equivalent to the angular position, will be in the form of three signals displaced 120° apart and may therefore be accepted by conventional synchros as angle data similar to that received from a conventional synchro transmitter.

Referring again to FIG. 2, there is shown in the signal channel 24 a solid state modulator 31 wherein an A.C. reference signal, i.e. 400 Hz. is applied to a transformer 32 and transmitted to transistor 33, which is thereby alternately turned on and off at a rate proportional to the frequency of the A.C. source. Thus, the D.C. signal applied to the emitter of transistor 33 over line 35 from potentiometer 9 is modulated or chopped by transistor 33 to form a square wave which in turn is formed into an alternating square wave by blocking the average value with a series coupled capacitor 37. The alternating square wave is then formed by a shaping network 36 into a sine wave. The shaping network 36 may be comprised of a conventional operational amplifier, or a Class A amplifier (as shown in FIGS. 9–6 of CE Transistor Manual, 7th ed.), or any other conventional amplifier with appropriate frequency shaping, i.e. operational amplifiers 38 and 39. As shown, the input signal over line 40 from reference 10 in reference channel 26 is processed by the same components as the components in signal channel 24. The output signals from each channel are applied to the Scott-T 29, wherein the output from the signal channel 24 is applied to terminal 41 and the output from reference channel 26 is applied to terminal 42. The Scott-T output signals at terminals 43, 44, and 45 are proportional to the angular position and may be transmitted as signals from a synchro transmitter to drive an instrument, or control a vehicle, etc.

Figure 3:
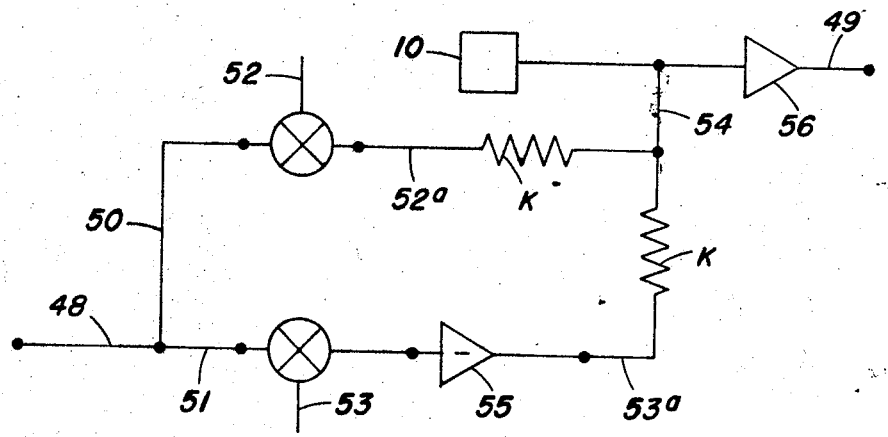
FIG. 3 illustrates a circuit which may be connected at B in channel 26 in FIG. 2.

If desired this D.C. signal to synchro conversion may be improved or its angular range extended by modifying the cosine approximation, i.e. by subtracting from the D.C. reference signal (cosine signal) a percentage of the input signal from the potentiometer 9 (sine signal). Thus, the signals from the reference source 10 and from the potentiometer 9 may first be compared in a polarity detector (not shown) to determine the quadrant of operation, i.e. first quadrant operation when signals are of the same polarity, and fourth quadrant operation if of opposite polarity. A single signal from the polarity detector may then be applied to the circuit shown in FIG. 3. In this figure, the signal from the potentiometer 9, i.e. point A, FIG. 2, which is to be modified is applied at 48 to circuit legs 50 and 51. The polarity detection signal is applied either at the summing point 52, if it is of negative polarity, or at the summing point 53, if it is of positive polarity where the signal is passed through a unity gain conversion buffer amplifier 55. The modified potentiometer signal at 52a or at 53a is then operated on by a scaling factor K which is determined by the tolerable error and/or the angular extent of interest within the limitations of this approximation. The signal at 54 is then added to a signal from the D.C. reference source 10 and passed through a unity gain buffer amplifier 56 to an output line 49 to give a better approximation of the cosine function. This circuit may be connected to the converter illustrated in FIG. 2 by connecting line 49 to point B in FIG. 2 to replace D.C. source 10 and by connecting line 48 to point A in FIG. 2.

Figure 4:
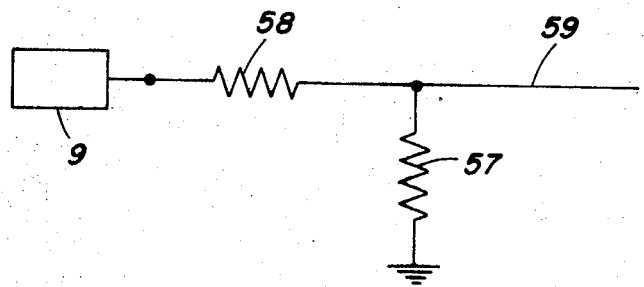
FIG. 4 illustrates a circuit which may be connected at A in channel 24 in FIG. 2.

If desired, a still more accurate approximation may be obtained by shaping networks provided at the input to the signal channel 24 which may consist of placing a voltage sensitive nonlinear resistor 57 in series with a resistor 58 to an output line 59, as shown in FIG. 4. This circuit may then be connected to the converter illustrated in FIG. 2 by connecting line 59 of FIG. 4 to point A in FIG. 2 to replace signal 9.

It should be understood, of course, that the foregoing disclosure relates to only a preferred embodiment of the invention and that it is intended to cover all changes and modifications of the examples of the invention herein chosen for the purposes of the disclosure, which do not constitute departures from the spirit and scope of the invention.

What is claimed is:

1. A D.C. signal to synchro signal converter comprising,
 a reference source of D.C. voltage,
 a D.C. position signal representing the angular position of a device,
 a reference channel means coupled to said reference source and a signal channel means coupled to said D.C. position signal,
 each of said channel means comprising,
  a modulator means for converting D.C. signals into a square wave,
  a filter means for shaping said square wave into a sine wave, and
 Scott-T means connected to said filter means in each of said channel means and adapted to convert said sine waves into three output signals representing the equivalent synchro components of angular position of said device.

2. The converter as recited in claim 1 wherein said reference channel means are coupled to said D.C. position signal through a circuit means which is responsive to said D.C. reference voltage to reduce the D.C. position signal.

3. The converter as recited in claim 1 further including non-linear circuit means adapted to be connected between said D.C. position signal source and said signal channel means to change the position signals non-linearly with a changing D.C. position signal.

References Cited

UNITED STATES PATENTS

| | | | |
|---|---|---|---|
| 3,045,154 | 7/1962 | Pentecost | 318—23 |
| 3,377,589 | 4/1968 | Materer et al. | 340—198 X |
| 3,465,256 | 9/1969 | Moses | 318—30 |

J D MILLER, Primary Examiner

W. H. BEHA, Jr., Assistant Examiner

U.S. Cl. X.R.

318—30; 321—8; 340—198